United States Patent [19]

Pudleiner et al.

[11] Patent Number: 5,621,065
[45] Date of Patent: Apr. 15, 1997

[54] POLYCARBONATE DIOLS, THEIR PREPARATION AND USE AS STARTING PRODUCTS FOR POLYURETHANE PLASTICS

[75] Inventors: Heinz Pudleiner, Krefeld; Hans-Georg Hoppe, Leichlingen; Klaus König, Odenthal, all of Germany

[73] Assignee: Bayer Aktiengesellschift, Leverkusen, Germany

[21] Appl. No.: 626,229

[22] Filed: Mar. 29, 1996

[30] Foreign Application Priority Data

Apr. 7, 1995 [DE] Germany ............ 195 13 164.9

[51] Int. Cl.⁶ .................. C08G 18/34; C08G 64/00
[52] U.S. Cl. .................. 528/84; 528/80; 528/196; 528/198; 528/201; 528/202
[58] Field of Search ............... 528/80, 84, 196, 528/198, 201, 202

[56] References Cited

U.S. PATENT DOCUMENTS

| Re. 29,224 | 5/1977 | Pedain et al. | 528/80 |
|---|---|---|---|
| 3,631,200 | 12/1971 | Nebring et al. | 558/260 |
| 3,640,967 | 2/1972 | König et al. | 528/80 |
| 3,758,443 | 9/1973 | Konig et al. | 528/80 |
| 3,867,350 | 2/1975 | Pedain et al. | 528/76 |
| 4,105,641 | 8/1978 | Buysch et al. | 526/712 |
| 4,808,691 | 2/1989 | König et al. | 528/76 |
| 5,229,431 | 7/1993 | Pinchuk | 521/159 |
| 5,254,662 | 10/1993 | Szycher et al. | 528/67 |

FOREIGN PATENT DOCUMENTS

| 857948 | 12/1952 | Germany . |
| 1263225 | 2/1972 | United Kingdom . |
| 1476268 | 6/1977 | United Kingdom . |

OTHER PUBLICATIONS

P. Ball, H. Fuillmann and W. Heitz Angew. Chem. 92, 1980 (Month unavailable) No. 9 pp. 742 and 743. (English translation attached).

*Primary Examiner*—Terressa Mosley
*Attorney, Agent, or Firm*—Joseph C. Gil; N. Denise Brown

[57] ABSTRACT

This invention relates to novel polycarbonates having hydroxyl end groups and an average molecular weight of 500 to 12,000, as determined by measuring the OH number, and being based on dimer diols containing either 36 or 44 carbon atoms. These novel polycarbonates are particularly suitable for the use in a process for the production of polyurethane plastics which are stable to hydrolysis and oxidation.

4 Claims, No Drawings

POLYCARBONATE DIOLS, THEIR PREPARATION AND USE AS STARTING PRODUCTS FOR POLYURETHANE PLASTICS

BACKGROUND OF THE INVENTION

The present invention relates to new polycarbonate diols based on dimer diols, to the preparation of these polycarbonate diols and to their use as starting materials for high-value polyurethane plastics.

Aliphatic polycarbonate diols are by no means new. They are prepared from non-vicinal diols by reaction with diaryl carbonate (DE 1,915,908), dialkyl carbonate (DE 2,555, 805), dioxolanones (DE 2,523,352), phosgene (DE 1,595, 446), bis-chlorocarbonates (DE 857,948) or urea (P. Ball, H. Fuillmann and W. Heitz, Angew. Chem. 92 1980 no. 9, p 742, 743).

Of the diols described in the literature, only those based exclusively or predominantly on hexane-1,6-diol have previously gained any major industrial importance. For example, high-value polyurethane elastomers and coating agents are produced from hexanediol-polycarbonate according to known methods, which elastomers and coating agents are used for the production of articles with a long service life particularly on account of the outstanding resistance to hydrolytic influences. The resistance to hydrolysis of such polyurethanes is known to be orders of magnitude better than that of polyurethanes based on adipic acid polyester as diol component. Pure hexanediol-polycarbonates (having molecular weights of about 500 to 4,000) are waxes with a softening point of 45°–55° C. (depending on the MW). As a consequence of the crystallization tendency of the soft segment, the corresponding polyurethanes tend to harden at low temperatures and to lose their flexibility. In order to overcome this serious disadvantage, hexanediol-polycarbonates were prepared in which the softening point was reduced to a greater or lesser extent by incorporating interfering components, depending on their proportion. Since the relatively long-chain diols suitable for this purpose were not available industrially, adipic acid (DE 1,964,998), caprolactam (DE 1,770,245) or di-, tri- and tetraethylene glycol (DE 2,221,751) were used for said purpose. The result was a reduction in the resistance to hydrolysis of the polyurethanes due to the more readily hydrolyzing ester groups and the hydrophilic ether segments.

Polycarbonate polyurethanes (PU) are used increasingly in areas in which the articles produced from them are also exposed to hydrolytic influences aside from attack by microorganisms. This applies, e.g. to catheters, prostheses, jackets for cardiac pacemaker housings and cardiac pacemaker electrode leads.

Polyurethanes based on polyethers are known to be markedly more resistant to degradation by hydrolysis. The polymers of tetrahydrofuran exclusively suitable and also used for the above-mentioned fields of application with high quality requirements do, however, have some other disadvantages. In this case, too, the crystallinity leads to a hardening tendency on the part of the polyurethane at low temperatures, particularly if the desired range of properties of the polyurethanes requires the use of soft segments with an average MW of 2,000 and above. Only recently, has a particular disadvantage of polyurethanes based on polyethers been recognized. This disadvantage is that such polyurethanes tend to form cracks on the surface of molded articles when used in the body, contrary to the widely-held view, i.e. oxidative degradation of such products can no longer be excluded.

Polycarbonate polyurethanes are known from U.S. Pat. No. 5,229,431 from which molded articles which are said to be stable to oxidation are prepared. Moreover, polycarbonate polyurethanes are known from WO 92/04390 which are said to be suitable for the preparation of molded articles and disclosed as being biostable in in vitro and in vivo tests. A disadvantage of these polycarbonate polyurethanes, however, is that they are by no means as stable to hydrolysis as is required for long-term application. This is also confirmed by the in vitro hydrolysis and oxidation tests in the comparison examples of the present application.

Moreover, polyether polycarbonate diols are described in EP-B 0,292,772 which can be used for the preparation of polyurethane plastics. The polyurethane plastics prepared in this way need to be improved, however, with regard to their stability to hydrolysis and in particular to oxidation. As the comparison examples of the present application also show, ether groups, in particular, in the soft segment are susceptible to oxidative degradation. Polyether polycarbonate diols therefore have corresponding disadvantages.

Surprisingly, it was found that very suitable polyol components are obtained for the preparation of high-value polyurethane plastics which are superior to the polyurethane plastics containing conventional aliphatic polycarbonates in terms of stability to hydrolysis and oxidation, and which do not, moreover, have the above-mentioned disadvantages if dimer diols containing either 36 or 44 carbon atoms are reacted with suitable derivatives of carbonic acid to form relatively long-chain polycarbonate diols.

DESCRIPTION OF THE INVENTION

The present invention is directed to polycarbonates having hydroxyl end groups and an average molecular weight of about 500 to 12,000, preferably 700 to 6,000, as determined by measuring the OH number. These polycarbonates are based on one or more dimer diols containing either 36 or 44 carbon atoms, preferably 36 carbon atoms, wherein the dimer diols correspond at least one of the general formulae (I) to (V)

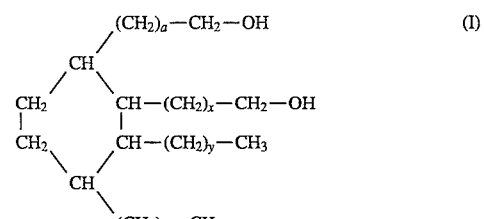

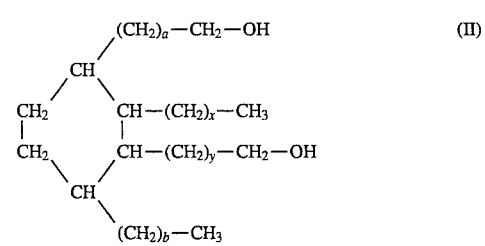

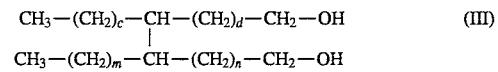

-continued

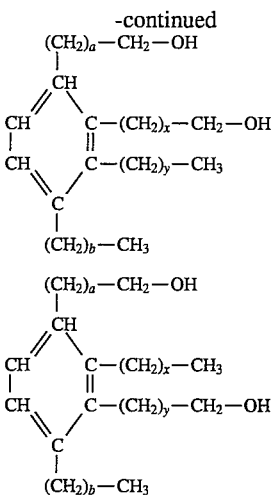

(IV)

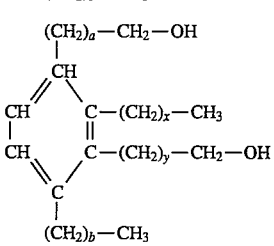

(V)

wherein:

in formulae I, II, IV and V: $a+b=12$ and $x+y=14$, or $a+b=16$ and $x+y=18$, and in formula III: $c+d=15$ and $m+n=15$, or $c+d=19$ and $m+n=19$.

Up to 95 mol. %, preferably up to 50 mol. %, of the compounds corresponding to formulae (I) to (V) on which the polycarbonates are based may be replaced by aliphatic diols containing from 3 to 12 carbon atoms, and preferably from 5 to 12 carbon atoms.

Dimer diols suitable for the polycarbonates of the invention include those diols which may be prepared by the reduction of both carboxyl groups of the hydrogenated dimer fatty acids to primary alcohol groups. Hydrogenated dimer fatty acids include acids which may be obtained by dimerization of octadeca-dienoic acids, optionally with the addition of up to one equivalent of octenoic acid, followed by hydrogenation, or by dimerization of erucic acid ($C_{22}$) followed by hydrogenation (compare e.g. Ullmanns Encyclopedia of Industrial Chemistry 5th Edition Vol. A8, p 535–536).

The dimer diols corresponding to formulae (I) to (V) may be used alone or in mixture with each other. They are used preferably as a mixture of the kind which is produced during the reduction of hydrogenated dimer fatty acids. Dimer diols are available, e.g. under the tradename "Pripol®" from Unichema, Emmerich, Germany.

As mentioned above, the dimer diols corresponding to formulae (I) to (V) above which contain 36 carbon atoms are preferably used.

A portion of the dimer diols may be replaced by other aliphatic diols, as mentioned, to form the polycarbonates according to the invention. It is possible to replace up to 95 mol. % of the dimer diols with aliphatic diols. Preferably, up to 50 mol. % of the dimer diols are replaced with the aliphatic diols.

Following are examples of aliphatic diols which are suitable for the present invention. These suitable aliphatic diols include pentane-1,5-diol, 3-methylpentane-1,5-diol, hexane-1,6-diol, heptane-1,7-diol, octane-1,8-diol, 2-methyloctane-1,8-diol, nonane-1,9-diol, decane-1,10-diol, oligomers of ethylene oxide and of propylene oxide such as diethylene glycol, triethylene glycol, and tetraethylene glycol, dipropylene glycol and tetrapropylene glycol. Small quantities of trimethylolethane, trimethylolpropane and pentaerythritol may be used for branching in the case of the oligomers. Hexane-1,6-diol and octane-1,8-diol are preferably used. These aliphatic diols may also be used both individually and in any mixture with each other.

Diaryl carbonates, dioxolanones, hexanediol bis-chlorocarbonates, phosgene or urea are suitable for reaction with the dimer diols to yield the novel polycarbonates of the present invention. The following compounds are particularly suitable: diaryl carbonates such as diphenyl-, ditolyl-, dixylyl-, dinaphthyl carbonate, dialkyl carbonates such as diethyl-, dipropyl-, dibutyl-, diamyl-, dicyclohexyl carbonate, dioxolanones such as ethylene- and propylene carbonate, hexane-1,6-diol bis-chlorocarbonate, phosgene and urea. Diphenyl carbonate is particularly preferred.

The invention also includes a process for the preparation of these novel polycarbonates having hydroxyl end groups. This process comprises reacting one or more of the dimer diols corresponding to the formulae (I) to (V) above in a known manner, optionally in mixture with the aliphatic diols containing from 3 to 12, preferably from 5 to 12 carbon atoms, with one or more compounds selected from the group consisting of diaryl carbonates, dialkyl carbonates, dioxolanones, hexanediol bis-chlorocarbonates, phosgene and urea, to yield polycarbonates having an average molecular weight of about 500 to 12,000. It is preferred that the dimer diol(s) is reacted with diphenyl carbonate(s) to yield polycarbonate(s) having an average molecular weight of about 700 to 6,000. In this process, no more than 95 mol. %, preferably no more than 50 mol. %, of the total amount of dimer diols corresponding to formulae (I) to (V) is replaced with one or more aliphatic diols containing from 3 to 12 carbon atoms, preferably 5 to 12 carbon atoms.

In the process according to the invention, the dimer diols, and optionally, the aliphatic diols, are condensed with one or more carbonate-forming compounds such as, for example, those described above, at temperatures of about 120° to 220° C., preferably at temperatures of about 130° to 200° C., and under pressures of about 0.1 mbar to 200 mbar, preferably about 0.1 mbar to 100 mbar. The carbonate-forming compound is used in a defined deficient quantity such that the desired molecular weight according to the following equation results:

MW (polycarbonate)=n×MW (diol=dimer diols and aliphatic diols which are optional)+(n−1)×26.

wherein: n represents the number of moles of diol=dimer diols and aliphatic diols which are optional present, and (n−1) represents the number of moles of carbonate forming compound present.

In the above equation, 26 represents the molecular weight of the carbonyl group reduced by 2.

The reaction may be catalyzed by bases or transition metal compounds, such as dibutyltin oxide or tetrabutoxy titanium.

The novel polycarbonates having hydroxyl end groups are low-viscosity liquids or low-melting waxes. When only dimer diols are used as the polyol component to produce the polycarbonates, the product is a liquid at room temperature and, therefore, easy to handle. These liquid polycarbonates are the preferred polycarbonates of the present invention. When a mixture of, for example, 10 wt. % of dimer diol and 90 wt. % of hexane-1,6-diol is used as polyol component, the resulting polycarbonate has a softening range of 18°–22° C. and a molecular weight of approx. 2,000.

The polycarbonates of the invention may be used in a process for the preparation of polyurethane plastics which have favorable hydrolysis and oxidation properties. Thus, the present invention also provides for the use of these novel polycarbonates having hydroxyl end groups in the preparation of polyurethane plastics of the most varied kind. In this context, see the European Patent 0,292,772, in which polyurethane plastics are prepared in a similar manner.

The polyurethane plastics produced from the novel polycarbonates having hydroxyl end groups of the present invention are suitable for end uses such as, for example, as films, sealing protection in aqueous media, and, particularly, as catheters and cardiac pacemakers.

The following examples further illustrate details for the process of this invention. The invention, which is set forth in the foregoing disclosure, is not to be limited either in spirit or scope by these examples. Those skilled in the art will readily understand that known variations of the conditions of the following procedures can be used. Unless otherwise noted, all temperatures are degrees Celsius and all percentages are percentages by weight.

EXAMPLES

The following materials were used in the Examples:
Dimer Diol Pripol® 2033: compound corresponding to formula (I) and (II) approx. 50%, compound corresponding to formula (III) approx. 30%, compound corresponding to formula (IV) and (V) approx. 20%.

Preparation of Polycarbonates

Example 1

A four-necked flask apparatus is fitted with a contact thermometer, column, distillation bridge heated to 40° C. and a descending intensive condenser with a 2 l receiver. 1,938 g (3.4 mol) of dimer diol Pripol 2033® (having an OH number of 197, MW=570 g/mol, min. 98% dimer, max 1% trimer), 514.1 g (2.4 mol) of diphenyl carbonate and 1 g of dibutyltin oxide as catalyst were introduced into the flask and heated to 140° C. Within 6 hours the temperature at the bottom of the flask was raised from 140° C. to 180° C. and phenol was distilled off (temperature at the top 78° C.). The residual phenol was subsequently distilled under reduced pressure (at 0.1 mbar) (temperature at the top 45° C.), the temperature at the bottom being raised to 200° C. within 2 hours.

A colorless, viscous liquid having the following physical data was obtained:

| OH number: | 57.5 |
|---|---|
| Molecular weight: | 1,951 g/mol |
| Viscosity: | 23,100 mPa · s at 25° C. |

Example 2

In the same way as Example 1, 570 g (1 mol) of dimer diol Pripol 2033® and 1,156.4 g (9.8 mol) of hexane-1,6-diol were condensed with 2,099.2 g (9.8 mol) of diphenyl carbonate in the 4 l four-necked flask. A colorless wax having the following physical data was obtained:

| OH number: | 58.0 |
|---|---|
| Molecular weight: | 1,935 g/mol |

Preparation of Polyurethane Elastomers

Example A 780 g (0.400 mol) of the polycarbonate produced by the process described in example 1 above were charged to a 2 l flat-flange flask equipped with a stirrer, a thermometer and a reflux condenser. Water was removed at 120° C. for 1 hour at 14 mbar. 0.13 g of dibutyltin dilaurate as catalyst and 415.8 g (1.587 mol) of bis-(4-isocyanate-cyclohexyl)-methane were then added, and the mixture was stirred at 120° C. until an NCO value of 8.34 wt. % was obtained. 104.2 g (1,156 mol) of butane-1,4-diol was stirred into this prepolymer as a chain extender. After homogenization, the reacting mixture was poured onto Teflon pans after approx. 1 minute. This mixture solidified after a few minutes, and was subsequently heat-treated again for 12 hours at 100° C.

Following completion of the reaction, the sheets were comminuted and molded articles formed by injection molding. A polyurethane was obtained with the properties shown in the tables in the hydrolysis and oxidation tests.

| Tensile strength: | 16.4 MPa |
|---|---|
| Elongation at break: | 390% |

The polyurethane was not optimized to maximum tensile strength.

Example B 780 g (0.403 mol) of the polycarbonate produced by the process described in example 2 above were charged to a 2 l flat-flange flask with a stirrer, a thermometer and a reflux condenser. Water was removed at 120° C. for 1 hour at 14 mbar. 0.13 g of dibutyltin dilaurate as catalyst and 416.0 g (1.588 mol) of bis-(4-isocyanate-cyclohexyl)-methane were then added, and the mixture was stirred at 120° C. until an NCO content of 8.32 wt. % was obtained. 104.0 g (1,154 mol) of butane-1,4-diol were stirred into this prepolymer as a chain extender. After homogenization, the reacting mixture was poured onto Teflon pans after approx. 1 minute. This mixture solidified after a few minutes and was subsequently heat-treated again for 12 hours at 100° C.

Following completion of the reaction, the sheets were comminuted and formed into molded articles by injection molding. A polyurethane was obtained with the properties as shown in the tables in the hydrolysis and oxidation tests.

| Tensile strength: | 20.8 MPa |
|---|---|
| Elongation at break: | 430% |

The polyurethane was not optimized to maximum tensile strength.

Comparison Example α

840 g (0.412 mol) of hexanediol-polycarbonate (having an OH number 55 and MW 2,039 g/mol) were charged to a 2 l flat-flange flask with a stirrer, a thermometer and a reflux condenser. Water was removed at 120° C. for 1 hour at 14 mbar. 0.13 g of dibutyltin dilaurate as catalyst and 446.5 g (1.704 mol) of bis-(4-isocyanate-cyclohexyl)-methane were then added, and the mixture was stirred at 120° C. until an NCO content of 8.44 wt. % was obtained. 113.5 g (1,259 mol) of butane-1,4-diol were stirred into this prepolymer as a chain extender. After homogenization, the reacting mixture was poured onto Teflon pans after approx. 1 minute. It solidified after a few minutes and was subsequently heat-treated again for 12 hours at 100° C.

Following completion of the reaction, the sheets were comminuted and molded articles by injection molding. A polyurethane was obtained with the properties shown in the tables in the hydrolysis and oxidation tests.

| Tensile strength: | 36.9 MPa |
| Elongation at break: | 470% |

Comparison Example β

A commercially available aromatic polyurethane (prepared according to comparison example α) based on bis-(4-isocyanate-phenyl)-methane, polytetrahydrofuran 1,000, butane-1,4-diol and other additives.

| Tensile strength: | 45.0 MPa |
| Elongation at break: | 650% |

Comparison Example γ

A commercially available cycloaliphatic polyurethane (prepared according to comparison example α) based on bis-(4-isocyanate-cyclohexyl) methane, polytetrahydrofuran 1,000, butane-1,4-diol and other additives.

| Tensile strength: | 32.0 MPa |
| Elongation at break: | 747% |

Hydrolysis tests

Tensile test bars were made of the polyurethanes of examples A and B and of the polyurethanes of comparison Examples α, β and γ. The tensile strength and elongation at break of the test bars were measured before the hydrolysis stability test began. Other specimens were stored at 90° C. in demineralized water and tested again in the tensile test after 7, 21 and 35 days' storage in water. The percentage shown for the tensile strength and elongation at break for each sample at the designated storage time is based on 100% of the original tensile strength and elongation at break for the untreated samples at the beginning of the test (see Table 1).

Oxidation Tests

Tensile test bars were made of the polyurethanes of Examples A and B and of the polyurethanes of comparison Examples α, β and γ. The tensile strength and elongation at break were measured before the test for resistance to oxidizing agents began. Other specimens were stored at 90° C. in a 1 M silver nitrate solution and tested again in the tensile test after 7, 21 and 35 days' storage. The percentage shown for the tensile strength and elongation at break for each sample at the designated storage time is based on 100% of the original tensile strength and elongation at break for the untreated samples at the beginning of the test (see Table 2).

TABLE 1

Hydrolysis tests
Tensile strength and elongation at break relative to the untreated samples (beginning)

| | Tensile strength | Elongation at break | Tensile strength | Elongation at break | Tensile strength | Elongation at break | Tensile strength | Elongation at break |
| --- | --- | --- | --- | --- | --- | --- | --- | --- |
| Test time | Beginning | | 7 days | | 21 days | | 35 days | |
| Example A | 100 | 100 | 100 | 110.3 | 92 | 88.5 | 88.4 | 92.7 |
| Example B | 100 | 100 | 80.8 | 108.1 | 80.3 | 94.2 | 83.2 | 94.7 |
| Comp. Ex. α | 100 | 100 | 86.4 | 106.4 | 83.5 | 98.9 | 83.5 | 97.9 |
| Comp. Ex. β | 100 | 100 | 69.3 | 112.3 | 56.2 | 113.8 | 60.7 | 117.7 |
| Comp. Ex. γ | 100 | 100 | 94.4 | 95.7 | 87.8 | 90.4 | 100 | 93.7 |

TABLE 2

Oxidation tests
Tensile strength and elongation at break relative to the untreated samples (beginning)

| | Tensile strength | Elongation at break | Tensile strength | Elongation at break | Tensile strength | Elongation at break | Tensile strength | Elongation at break |
| --- | --- | --- | --- | --- | --- | --- | --- | --- |
| Test time | Beginning | | 7 days | | 21 days | | 35 days | |
| Example A | 100 | 100 | 98.8 | 92.3 | 79.3 | 92.3 | 83.5 | 71.8 |
| Example B | 100 | 100 | 75 | 108.4 | 59.6 | 81.4 | 49.5 | 55.8 |
| Comp. Ex. α | 100 | 100 | 80.8 | 97.8 | 61.5 | 91.5 | 44.4 | 83.0 |

TABLE 2-continued

| | Oxidation tests Tensile strength and elongation at break relative to the untreated samples (beginning) | | | | | | | |
|---|---|---|---|---|---|---|---|---|
| | Tensile strength | Elongation at break | Tensile strength | Elongation at break | Tensile strength | Elongation at break | Tensile strength | Elongation at break |
| Comp. Ex. β | 100 | 100 | 22.2 | 73.3 | 10.9 | 38.5 | 1.3 | 3.8 |
| Comp. Ex. γ | 100 | 100 | 22.5 | 52.2 | 4.1 | 90.4 | 9.1 | 18.7 |

Result

It can clearly be seen from the tables that the polyurethane according to the invention of Example A in the series of samples examined has the best resistance to hydrolysis and oxidation. It can also be seen that the polyurethane of Example B (based on the polycarbonate of Example 2 and having only 10 wt. % of dimer diol in the polycarbonate soft segment) is also better than the polyurethane of comparison example α. The polyurethanes of comparison Examples β and γ lost more than three quarters (or 75%) of their tensile strength after only 1 week's storage in silver nitrate solution. At the same time, the elongation at break falls markedly. These results suggest a dramatic drop in molecular weight since, although these polyurethanes also lose tensile strength in the hydrolysis test in demineralized water, this can be attributed substantially to the softening effect of the water absorbed if the elongation at break increases or remains almost unchanged. A possible fall in molecular weight is over-compensated for at least by the softening effect of the water and is therefore not discernible.

Although the invention has been described in detail in the foregoing for the purpose of illustration, it is to be understood that such detail is solely for that purpose and that variations can be made therein by those skilled in the art without departing from the spirit and scope of the invention except as it may be limited by the claims.

What is claimed is:

1. Polycarbonates having hydroxyl end groups and average molecular weights of 500 to 12,000, and being based on one or more dimer diols containing either 36 or 44 carbon atoms which correspond to the general formulae (I) to (V)

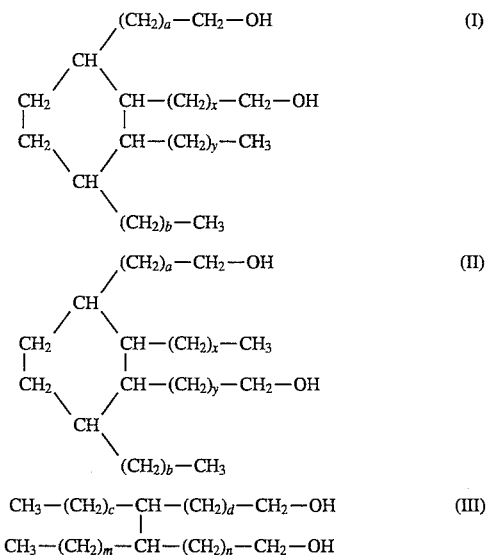

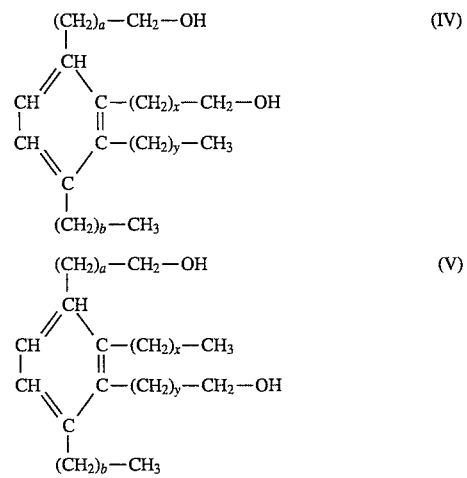

wherein:

in formulae I, II, IV and V: a+b=12 and x+y=14, or a+b=16 and x+y=18 and in formula III: c+d=15 and m+n=15, or c+d=19 and m+n=19, and wherein up to 95 mol. % of the dimer diols corresponding to formulae (I) to (V) may be replaced by aliphatic diols containing from 3 to 12 carbon atoms.

2. The polycarbonates of claim 1, wherein up to 50 mol. % of the compounds corresponding to formulae (I) to (V) may be replaced by aliphatic diols containing from 5 to 12 carbon atoms.

3. A process for the preparation of the polycarbonates of claim 1, wherein said one or more dimer diols corresponding to formulae (I) to (V) are reacted with diaryl carbonates, dialkyl carbonates, dioxolanones, hexanediol-bis-chlorocarbonates, phosgene or urea to form polycarbonates with a molecular weight of 500–12,000, wherein up to 95 mol. % of the dimer diols corresponding to formulae (I) to (V) may be replaced by aliphatic diols containing from 3 to 12 carbon atoms.

4. In a process for the preparation of polyurethane plastics comprising reacting a polyisocyanate with an organic compound containing isocyanate-reactive hydrogen atoms and a chain extender, and allowing the compounds to fully react to form a polyurethane plastic, the improvement wherein said organic compound containing isocyanate-reactive hydrogen atoms comprises the polycarbonates having hydroxyl end groups and average molecular weights of 500 to 12,000 of claim 1.

* * * * *